United States Patent [19]

Hostert et al.

[11] 4,371,082
[45] Feb. 1, 1983

[54] BICYCLE RACK

[75] Inventors: Richard J. Hostert, Cascade; Michael J. Mathiasmeier, Burlington; Robert J. Gilbert, Sioux City, all of Iowa

[73] Assignee: Iowa State University Research Foundation, Inc., Ames, Iowa

[21] Appl. No.: 203,532

[22] Filed: Nov. 3, 1980

[51] Int. Cl.³ .............................................. A47F 7/04
[52] U.S. Cl. .......................................... 211/22; 70/62; 211/20
[58] Field of Search ...................... 211/4, 5, 17, 18, 19, 211/20, 21, 22; 70/58, 62, 57

[56] References Cited

U.S. PATENT DOCUMENTS

| | | | |
|---|---|---|---|
| 512,548 | 1/1894 | Hurlbut | 211/20 X |
| 597,507 | 1/1898 | McIntosh | 211/5 X |
| 650,663 | 5/1900 | Whitcher | 211/18 |
| 2,329,088 | 9/1943 | Schram et al. | 211/17 |
| 3,841,119 | 10/1974 | Kaufmann | 70/58 |

FOREIGN PATENT DOCUMENTS

| | | | |
|---|---|---|---|
| 1097303 | 1/1961 | Fed. Rep. of Germany | 211/17 |
| 992772 | 5/1965 | United Kingdom | 211/17 |

*Primary Examiner*—Francis K. Zugel
*Assistant Examiner*—Robert W. Gibson, Jr.
*Attorney, Agent, or Firm*—Zarley, McKee, Thomte, Voorhees & Sease

[57] ABSTRACT

A bicycle rack designed to support and lock a bicycle by the bicycle's front center post. Support and lock brackets for individual bicycles are horizontally disposed fork arrangements formed by two joined U-shaped members. Oppositely extending locking brackets allow pairs of bicycles to be conveniently placed along a series of evenly spaced posts and cross-bars.

5 Claims, 4 Drawing Figures

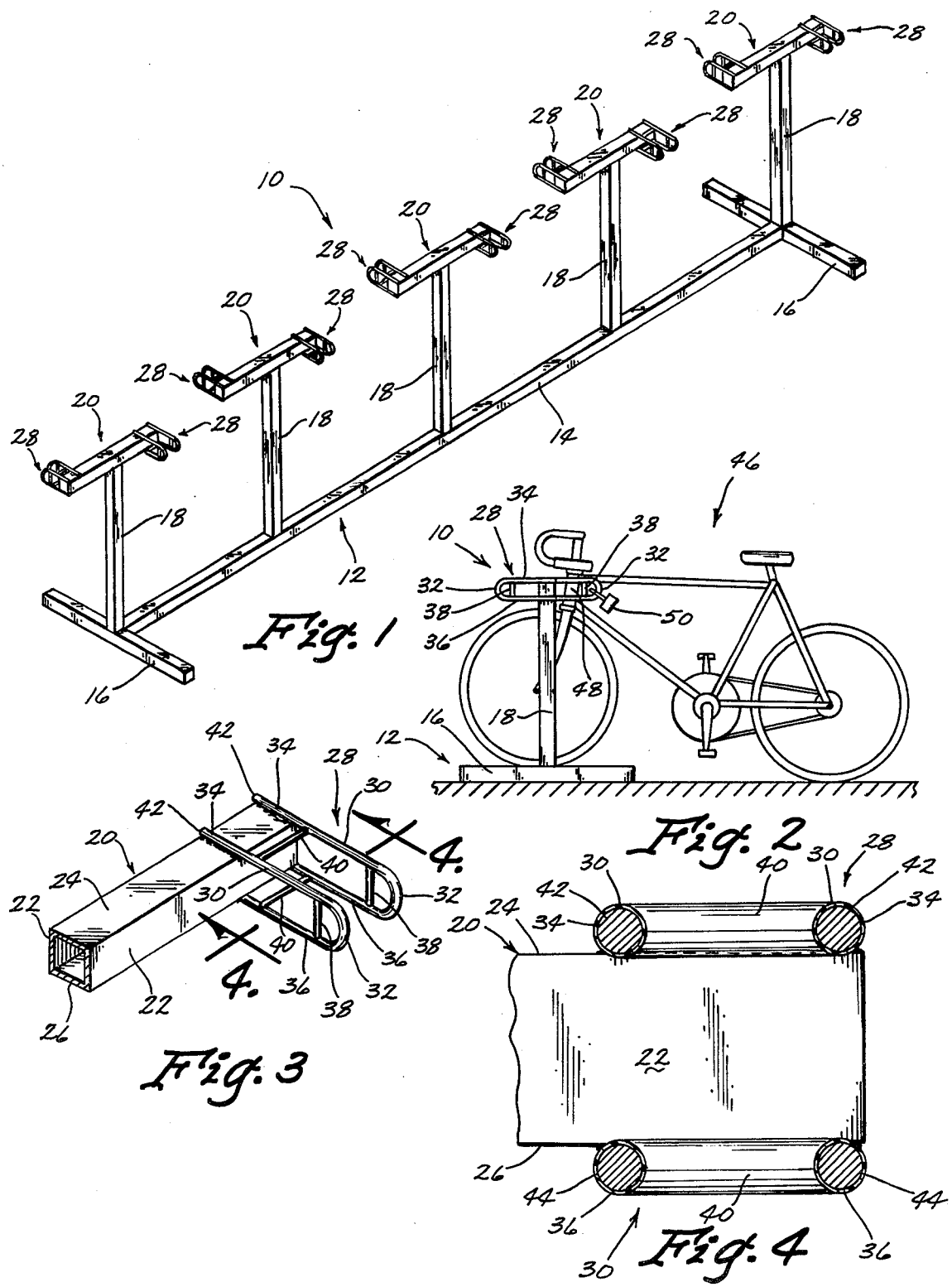

BICYCLE RACK

BACKGROUND OF THE INVENTION

Various bicycle racks have been designed over the years (e.g., Hurlbut, U.S. Pat. No. 2,512,548; White 640,433; Schram et al. 2,329,088; Laing, 2,873,034; Tedrick 3,138,260; Kaufmann 3,841,119; and Candlin 3,920,126) but many locked the bicycles to the support rack by fastening locks around the rack and wheel spokes. This relatively low support point allows the bicycle to shift and thereby twist and bend the supporting spokes and attached wheel rim as well as causing damage to brake cables.

BRIEF DESCRIPTION OF THE DRAWINGS

FIG. 1 is a perspective view showing the bicycle rack with five supporting posts.

FIG. 2 is a side view of the bicycle rack with a bicycle in place.

FIG. 3 is a sectional perspective view showing a portion of a support cross-bar and details of the lock bracket.

FIG. 4 is a rear view of a portion of a support cross-bar showing the position of an attached bracket.

SUMMARY OF THE INVENTION

A bicycle rack with fork support and lock brackets is disclosed. The bicycle rack is comprised of a series of T-shaped posts and cross-bars secured to a base member formed by adjoined beams. Each cross-bar has two oppositely and horizontally disposed fork brackets attached to it. The fork brackets are formed by two joined U-shaped members. Bicycles are stored by rolling a bicycle up to the base beam, and slipping the bicycle's front center post into the bracket. A lock may then be used to secure the bicycle to the rack by the center post. The oppositely disposed brackets afford ample space between riders to conveniently store their bicycles. This summary is meant as illustrative only and is not intended in a limiting sense.

A principal object of this invention is to store bicycles in a manner which prevents damage to wheels, spokes, wheel rims and brake cables.

Another object of this invention is to provide convenient access to individual bicycles when a large number are stored in a limited area.

DESCRIPTION OF THE PREFERRED EMBODIMENT

The bicycle rack 10 is generally comprised of a base member 12, which base member includes a central beam 14 and two perpendicularly disposed end supports 16, which end supports are joined at opposite ends of the central beam 14, and five evenly spaced vertical support posts 18.

Each support post has a cross-bar 20 which has a square cross-section and includes side members 22, a top 24, and a bottom 26. Cross-bars 20 are joined to their respective support posts 18 at right angles and are aligned along the length of central beam 14. Two fork brackets 28 are attached at opposite ends of each cross-bar 20 and are oppositely disposed parallel to the ground. Each fork bracket 28 is comprised of two parallel U-shaped members 30 consisting of a closed end 32, an upper leg 34 and a lower leg 36. The upper leg 34 and lower leg 36 of each U-shaped member are in the same vertical plane. Respective cross-bars 20 are attached between the upper leg 34 and lower leg 36 of each U-shaped member 30.

A first pair of reinforcing bars 38 is vertically disposed in the same vertical plane between the upper leg 34 and lower leg 36 of each U-shaped member 30 and are joined thereto at a point between the closed end 32 and the respective cross-bar 20. A second pair of reinforcing bars 40 is horizontally disposed in the same vertical plane between the two U-shaped members 30 of each forked bracket 28. One bar of the second pair of reinforcing bars 40 is joined between the two upper legs 34 of each forked bracket 28. The other bar of the second pair of reinforcing bars 40 is joined between the two lower legs 36 of each forked bracket 28. Reinforcing bars 40 are joined at a point between the first pair of reinforcing bars 38 and the respective cross bar 20. Upper legs 34 and lower legs 36 of each forked bracket 28 terminate at ends 42 and 44, respectively. Ends 42 and 44 are flush with the side member 22 of each respective cross-bar 20 which is farthest from the closed end 32 of each U-shaped member 30. A plastic coating covers brackets 28 as indicated in FIG. 4.

In operation, a bicycle 46 is slipped between U-shaped members 30 by placing the front center post 48 in a forked bracket 28. A lock 50 is passed between reinforcing bars 38 and closed ends 32 of a fork bracket 28 and secured, thereby locking the bicycle into the fork bracket 28 and bicycle rack 10.

It is clear from the above description that the bicycle rack 10 will accomplish at least all of its stated objectives.

What is claimed is:

1. A bicycle rack comprising a base,
   at least one support post attached to said base,
   at least one approximately horizontally disposed fork bracket attached to each support post,
   a horizontally disposed cross-bar attached to each support post,
   two fork brackets being oppositely disposed and attached to each cross-bar,
   said base including a center beam to which each support post is attached and which is in the same vertical plane as said cross-bar,
   said fork bracket including two parallel disposed U-shaped members, each comprising a closed end, a first leg and a second leg wherein said first and second legs are in the same vertical plane, whereby said first leg is the upper leg and said second leg is the lower leg, and wherein each of said U-shaped members is attached by each of said upper and lower legs to said cross-bar,
   said U-shaped members including a vertically disposed reinforcing bar attached to said upper and lower leg at a point between said closed end and said cross-bar.

2. The device of claim 1 wherein said forked brackets include parallel disposed first and second cross-supports wherein said first cross-support joins said upper legs of said U-shaped members of each of said forked brackets at a point between said reinforcing bar and said cross-bar, and said second cross-support joins said lower legs of said U-shaped members of each of said forked brackets at a point between said reinforcing bar and said cross-bar.

3. The device of claim 2 wherein said cross-supports of each of said forked brackets are in the same vertical plane.

4. The device of claim 3 wherein said reinforcing bars of each of said U-shaped members of each forked bracket are in the same vertical plane.

5. A bicycle rack comprising,
- a base including an elongated central beam and two longitudinally spaced apart support beams connected to opposite ends of the central beam and extended generally perpendicularly and horizontally therefrom,
- a plurality of upright support posts having lower ends fixed to said central beam,
- a horizontally disposed cross-bar attached at a medial position therealong to each of said support posts such that all of said cross-bars and central beam are in the same vertical plane, and
- a generally horizontally disposed fork bracket attached to each end of each cross-bar with the two fork brackets associated with each cross-bar extending therefrom in opposite transverse directions,
- each fork bracket including two parallel disposed U-shaped members, each comprising a closed end, a first leg and a second leg wherein said first and second legs are in the same vertical plane, whereby said first leg is the upper leg and said second leg is the lower leg, and wherein each of said U-shaped members is attached by each of said upper and lower legs to said cross-bar,
- said upright support posts being longitudinally spaced apart sufficiently that the adjacent fork brackets on the cross-bars of adjacent support posts are disposed in longitudinally spaced apart relation to provide a clearance passage therebetween.

* * * * *